(12) United States Patent
Zhang et al.

(10) Patent No.: US 12,377,552 B2
(45) Date of Patent: Aug. 5, 2025

(54) ROBOT FISH SYSTEM

(71) Applicant: Pioneer Material Precision Tech Co., Ltd., New Taipei (TW)

(72) Inventors: Chang-Qi Zhang, New Taipei (TW); Li-Yuan Yeh, New Taipei (TW); Tai-Yu Chen, New Taipei (TW); Jian-Jhih Huang, New Taipei (TW); Chih-Wei Shen, New Taipei (TW)

(73) Assignee: PIONEER MATERIAL PRECISION TECH CO., LTD., New Taipei (TW)

( * ) Notice: Subject to any disclaimer, the term of this patent is extended or adjusted under 35 U.S.C. 154(b) by 147 days.

(21) Appl. No.: 18/528,330

(22) Filed: Dec. 4, 2023

(65) Prior Publication Data

US 2025/0026019 A1    Jan. 23, 2025

(30) Foreign Application Priority Data

Jul. 18, 2023   (TW) ................................ 112126741

(51) Int. Cl.
| | |
|---|---|
| *B25J 11/00* | (2006.01) |
| *B25J 9/00* | (2006.01) |
| *B25J 19/02* | (2006.01) |

(52) U.S. Cl.
CPC ............. *B25J 11/00* (2013.01); *B25J 9/0009* (2013.01); *B25J 19/021* (2013.01)

(58) Field of Classification Search
CPC ........ B25J 11/00; B25J 9/0009; B25J 19/021; B63C 11/52; B63C 11/00; B63H 1/36; G01S 17/88

USPC ......................................................... 700/245
See application file for complete search history.

(56) References Cited

U.S. PATENT DOCUMENTS

| | | | |
|---|---|---|---|
| 9,937,986 B1* | 4/2018 | Oh .......................... | B63G 8/001 |
| 2013/0214726 A1* | 8/2013 | Teng ........................ | G01J 5/028 |
| | | | 250/349 |
| 2014/0203197 A1* | 7/2014 | Jeon ......................... | G01S 17/74 |
| | | | 250/557 |
| 2020/0001464 A1* | 1/2020 | Kim ........................ | B63H 1/36 |
| 2020/0006984 A1* | 1/2020 | Kim ....................... | B63G 8/001 |

FOREIGN PATENT DOCUMENTS

KR   20170143450 A * 12/2017   ............. G09F 23/14

* cited by examiner

*Primary Examiner* — Kira Nguyen
(74) *Attorney, Agent, or Firm* — HSML P.C.

(57) ABSTRACT

A robot fish system includes a robot fish, and a light-emitting device emitting a light signal. The robot fish includes a housing, on which first and second light receivers, a driving module and a processor are disposed. The processor is connected to the first and second light receivers and the driving module. The processor controls the driving module to operate in a left-turn mode to make the robot fish turn left when only the first light receiver receives the light signal, in a right-turn mode to make the robot fish turn right when only the second light receiver receives the light signal, in a straight-moving mode to make the robot fish move straight when both the first and second light receivers receive the light signal, and in a random mode to make the robot fish move randomly when none of the first and second light receivers receives the light signal.

10 Claims, 5 Drawing Sheets

_US 12,377,552 B2_

ROBOT FISH SYSTEM

CROSS-REFERENCE TO RELATED APPLICATION

This application claims priority to Taiwanese Invention Patent Application No. 112126741, filed on Jul. 18, 2023, and incorporated by reference herein in its entirety.

FIELD

The disclosure relates to a robot system, and more particularly to a robot fish system adapted to be used in a specific aquatic area.

BACKGROUND

Conventionally, a robot moves according to global positioning system (GPS) signals. However, quality of the GPS signals may be poor in an underwater environment, adversely affecting movement of the robot in the underwater environment.

SUMMARY

Therefore, an object of the disclosure is to provide a robot fish system that can alleviate at least one of the drawbacks of the prior art.

According to the disclosure, the robot fish system is adapted to be used in a specific aquatic area. The robot fish system includes a light-emitting device and a robot fish.

The light-emitting device is adapted to be disposed in the specific aquatic area, and is configured to emit a light signal in the specific aquatic area.

The robot fish is configured to move in the specific aquatic area. The robot fish includes a housing, a first light receiver, a second light receiver, a driving module and a processor.

The housing includes a head portion, and an opaque plate extending outwardly from the head portion.

The first light receiver is disposed on the head portion to the left of the opaque plate when looking in a forward direction of the housing, is exposed to an environment, and is configured to receive the light signal emitted from the light-emitting device.

The second light receiver is disposed on the head portion to the right of the opaque plate when looking in the forward direction, is exposed to the environment, and is configured to receive the light signal emitted from the light-emitting device.

The driving module is disposed on the housing, and is configured to operate in one of a random mode, a left-turn mode, a right-turn mode and a straight-moving mode for driving movement of the housing in the specific aquatic area.

The processor is disposed in the housing, and is electrically connected to the first light receiver, the second light receiver and the driving module. The processor is configured to perform an operation procedure. The operation procedure includes steps of: a) determining whether any one of the first light receiver and the second light receiver receives the light signal emitted from the light-emitting device, b) controlling the driving module to operate in the left-turn mode to make the robot fish turn left in the specific aquatic area when it is determined that only the first light receiver receives the light signal emitted from the light-emitting device, c) controlling the driving module to operate in the right-turn mode to make the robot fish turn right in the specific aquatic area when it is determined that only the second light receiver receives the light signal emitted from the light-emitting device, d) controlling the driving module to operate in the straight-moving mode to make the robot fish move straight in the specific aquatic area when it is determined that both the first light receiver and the second light receiver receive the light signal emitted from the light-emitting device, and e) controlling the driving module to operate in the random mode to make the robot fish move randomly in the specific aquatic area when it is determined that none of the first light receiver and the second light receiver receives the light signal emitted from the light-emitting device.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
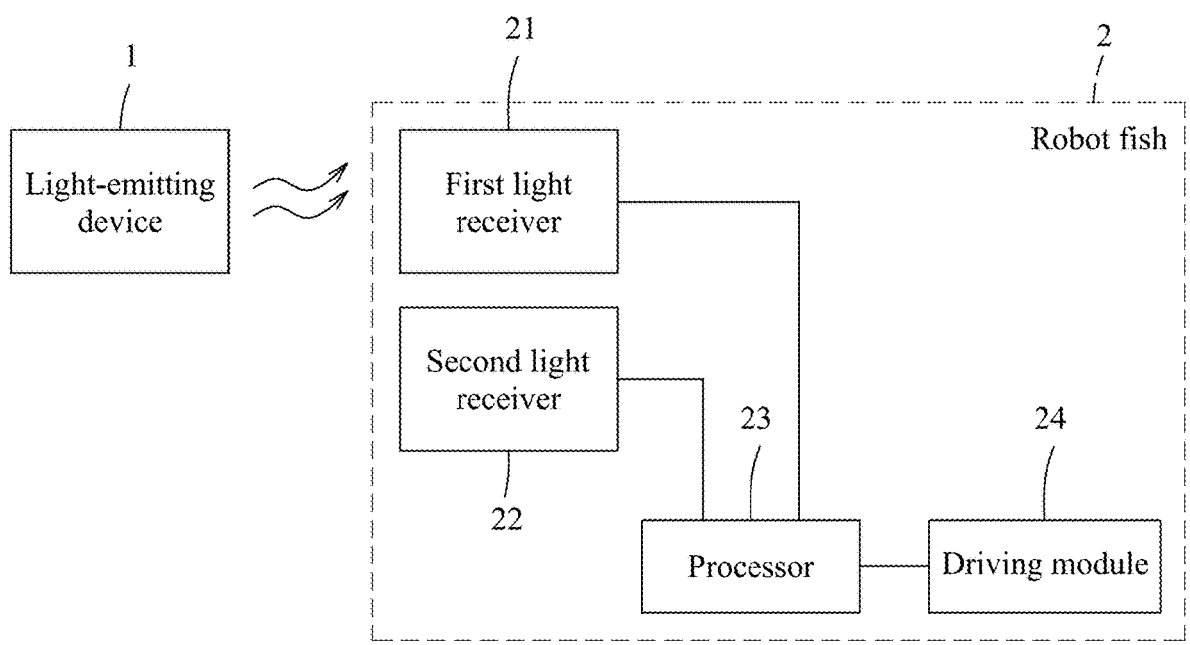
FIG. 1 is a block diagram illustrating a robot fish system according to a first embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
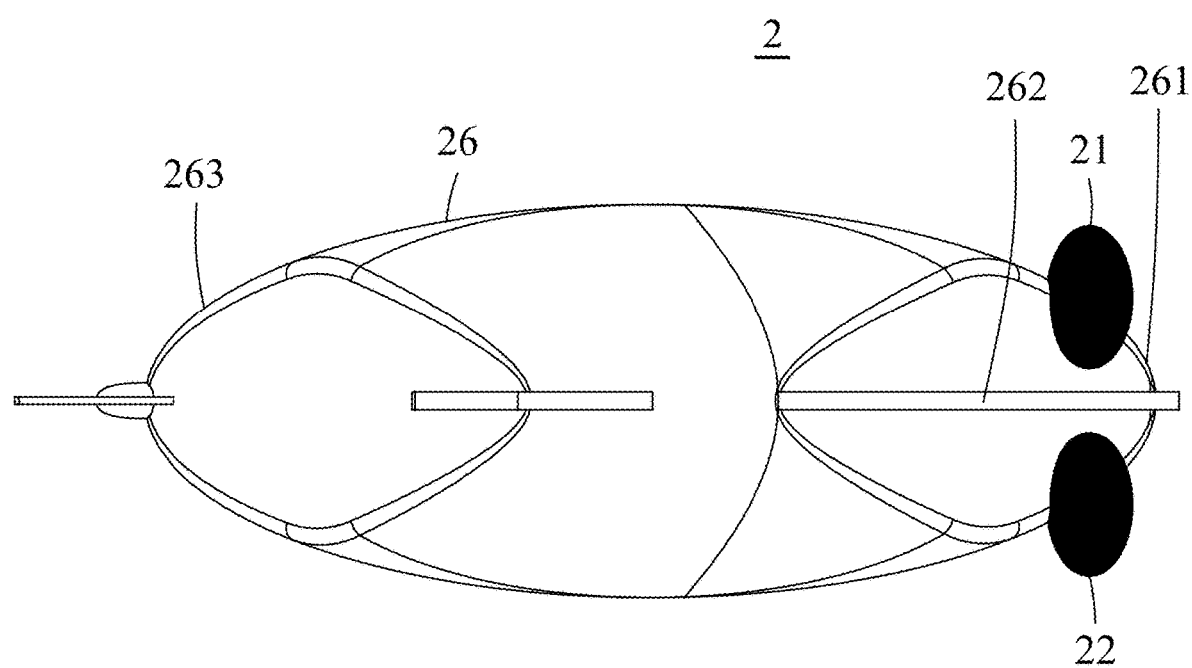
FIG. 2 is a top view of a robot fish of the robot fish system according to an embodiment of the disclosure.
Figure 3:
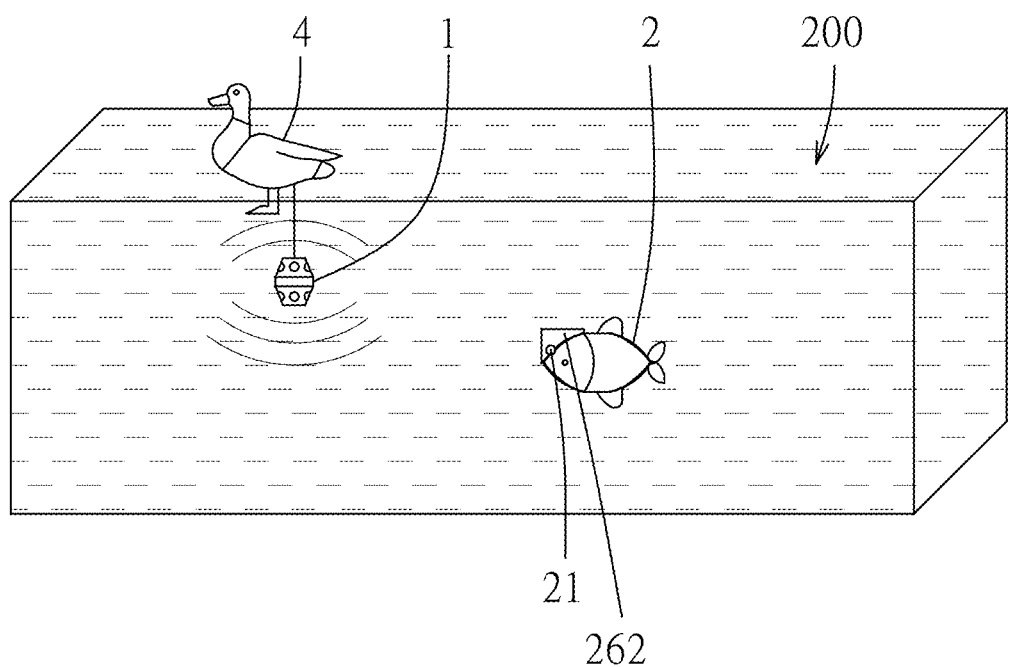
FIG. 3 is a schematic diagram illustrating a specific aquatic area where the robot fish system of the first embodiment of the disclosure is used.

Referring to FIGS. 1 to 3, a robot fish system 100 adapted to be used in a specific aquatic area 200 according to a first embodiment of the disclosure is illustrated. The robot fish system 100 includes a light-emitting device 1 and a robot fish 2. The specific aquatic area 200 may be defined by a pool, a pond, a fish bowl, a fish tank, an aquarium or the like.

The light-emitting device 1 is adapted to be disposed in the specific aquatic area 200, and is configured to continuously emit a light signal in the specific aquatic area 200. In this embodiment, the light-emitting device 1 is an infrared emitter that is configured to emit an infrared signal as the light signal. It is worth to note that the light-emitting device 1 is adapted to be disposed on a movable object 4 that is capable of moving in the specific aquatic area 200. The movable object 4 is an exemplary toy duck that can move on a surface of the specific aquatic area 200 as shown in FIG. 3.

The robot fish 2 is configured to move in the specific aquatic area 200, generally underwater. The robot fish 2 includes a housing 26, a first light receiver 21, a second light receiver 22, a driving module 24 and a processor 23.

The housing 26 includes a head portion 261, an opaque plate 262 extending outwardly and upwardly from the head portion 261, and a tail portion 263 opposite to the head portion 261.

The first light receiver 21 is disposed on the head portion 261 to the left of the opaque plate 262 when looking in a forward direction which is defined as a direction from the head portion 261 toward the tail portion 263, is exposed to the environment (e.g., water in the specific aquatic area 200), and is configured to receive the light signal emitted from the light-emitting device 1. The second light receiver 22 is disposed on the head portion 261 to the right of the opaque plate 262 when looking in the forward direction, is exposed to the environment, and is configured to receive the light signal emitted from the light-emitting device 1. That is to say, the first light receiver 21 and the second light receiver 22 are spaced apart by the opaque plate 262. In this embodiment, each of the first light receiver 21 and the second light receiver 22 is implemented by an infrared receiver, and is disposed on the top of the head portion 261 of the housing 26, but is not limited thereto.

The driving module 24 is disposed on the housing 26. The driving module 24 is configured to operate in one of a random mode, a left-turn mode, a right-turn mode and a straight-moving mode for driving movement of the housing 26 in the specific aquatic area 200. Specifically, the driving module 24 includes a motor (not shown) that is configured to rotate at a preset rotational speed, a propeller (not shown) that is configured to be driven by the motor for producing a propulsion force (thrust) to propel the housing 26, and a rudder (not shown) for directing movement of the housing 26, but is not limited thereto. When operating in the straight-moving mode, the driving module 24 drives the housing 26 to move straight in the forward direction in the specific aquatic area 200. When operating in the left-turn mode, the driving module 24 drives the housing 26 to turn left by a preset left-turn angle (which may be within an angular range of from 30 to 50 degrees) with respect to the forward direction in the specific aquatic area 200. When operating in the right-turn mode, the driving module 24 drives the housing 26 to turn right by a preset right-turn angle (which may be within an angular range of from 30 to 50 degrees) with respect to the forward direction in the specific aquatic area 200. When operating in the random mode, the driving module 24 drives the housing 26 to move randomly in the specific aquatic area 200.

The processor 23 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc. The processor 23 is disposed in the housing 26, and is electrically connected to the first light receiver 21, the second light receiver 22 and the driving module 24. The processor 23 is configured to perform an operation procedure that includes the following steps.

When performing the operation procedure, the processor 23 first determines whether any one of the first light receiver 21 and the second light receiver 22 receives the light signal emitted from the light-emitting device 1, and controls the driving module 24 to drive movement of the housing 26 in the specific aquatic area 200 according to the following algorithm based on a result of the determination. Specifically, each of the first light receiver 21 and the second light receiver 22 will output a reception signal to the processor 23 upon receiving the light signal emitted from the light-emitting device 1, and, for each of the first light receiver 21 and the second light receiver 22, the processor 23 may determine whether the first/second light receiver 21, 22 receives the light signal by determining whether the reception signal is received from the first/second light receiver 21, 22.

The processor 23 controls the driving module 24 to operate in the left-turn mode to make the robot fish 2 turn left in the specific aquatic area 200 when it is determined that only the first light receiver 21 receives the light signal emitted from the light-emitting device 1. In this way, the robot fish 2 moves toward the left while moving forward to approach the light-emitting device 1.

The processor 23 controls the driving module 24 to operate in the right-turn mode to make the robot fish 2 turn right in the specific aquatic area 200 when it is determined that only the second light receiver 22 receives the light signal emitted from the light-emitting device 1. In this way, the robot fish 2 moves toward the right while moving forward to approach the light-emitting device 1.

The processor 23 controls the driving module 24 to operate in the straight-moving mode to make the robot fish 2 move straight in the specific aquatic area 200 when it is determined that both the first light receiver 21 and the second light receiver 22 receive the light signal emitted from the light-emitting device 1. In this way, the robot fish 2 moves straight ahead to approach the light-emitting device 1.

The processor 23 controls the driving module 24 to operate in the random mode to make the robot fish 2 move randomly in the specific aquatic area 200 when it is determined that none of the first light receiver 21 and the second light receiver 22 receives the light signal emitted from the light-emitting device 1. In this way, the robot fish 2 would eventually receive the light signal emitted from the light-emitting device 1.

It is worth to note that the processor 23 periodically determines whether any one of the first light receiver 21 and the second light receiver 22 receives the light signal emitted from the light-emitting device 1. Therefore, when the robot fish 2 is in operation, the robot fish 2 would substantially follow a route of movement of the light-emitting device 1. In this way, the robot fish 2 would appear to follow the toy duck around, which would trigger people's interest in the robot fish system 100.

It should be noted that the opaque plate 262 is used to prevent the first light receiver 21 from receiving the light signal when the light-emitting device 1 is to the right of the robot fish 2, and to prevent the second light receiver 22 from receiving the light signal when the light-emitting device 1 is to the left of the robot fish 2. The opaque plate 262 has a height greater than that of each of the first light receiver 21 and the second light receiver 22. By virtue of the opaque plate 262, the robot fish 2 may move toward the light-emitting device 1 more accurately.

Figure 4:
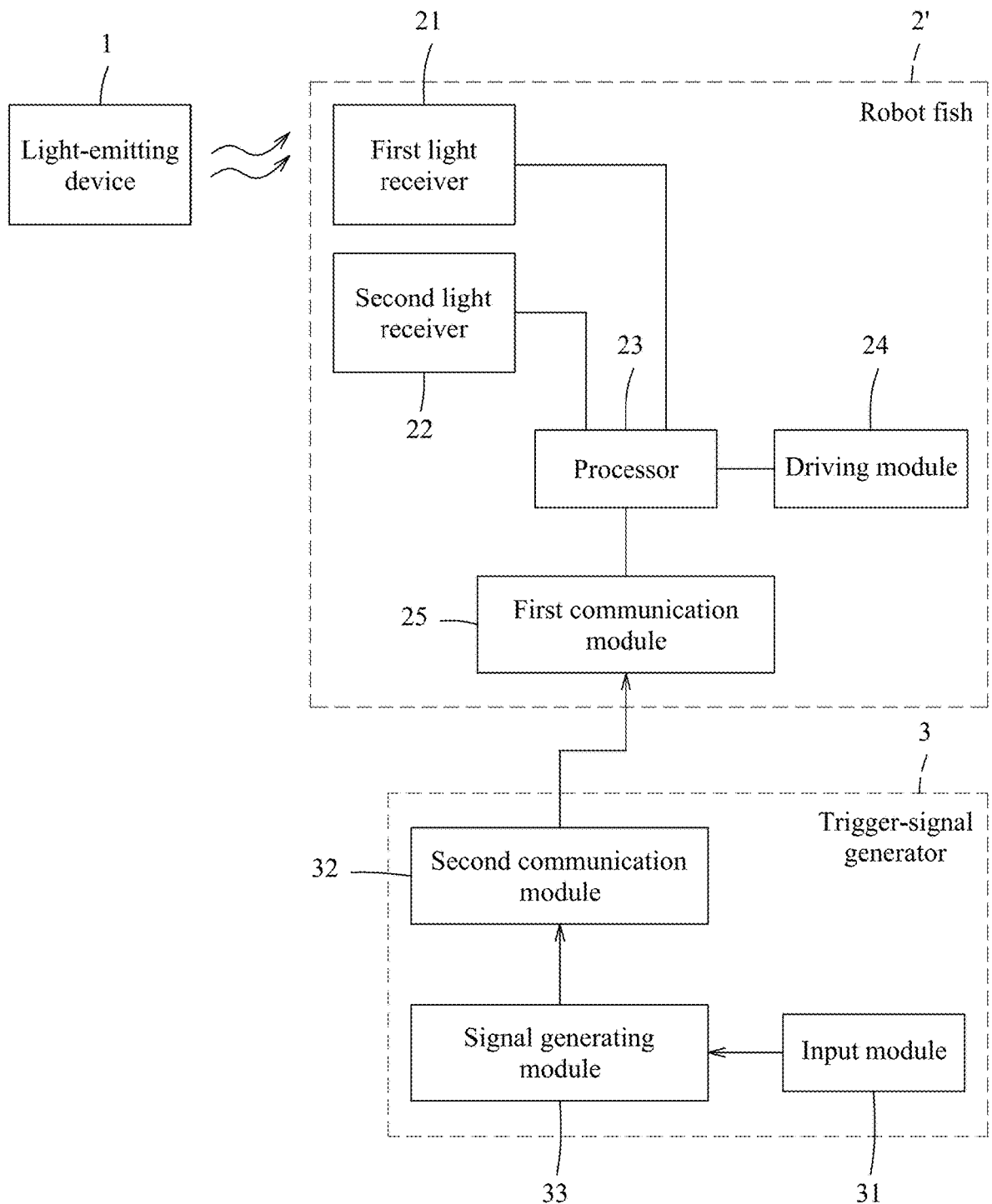
FIG. 4 is a block diagram illustrating the robot fish system according to a second embodiment of the disclosure.
Figure 5:
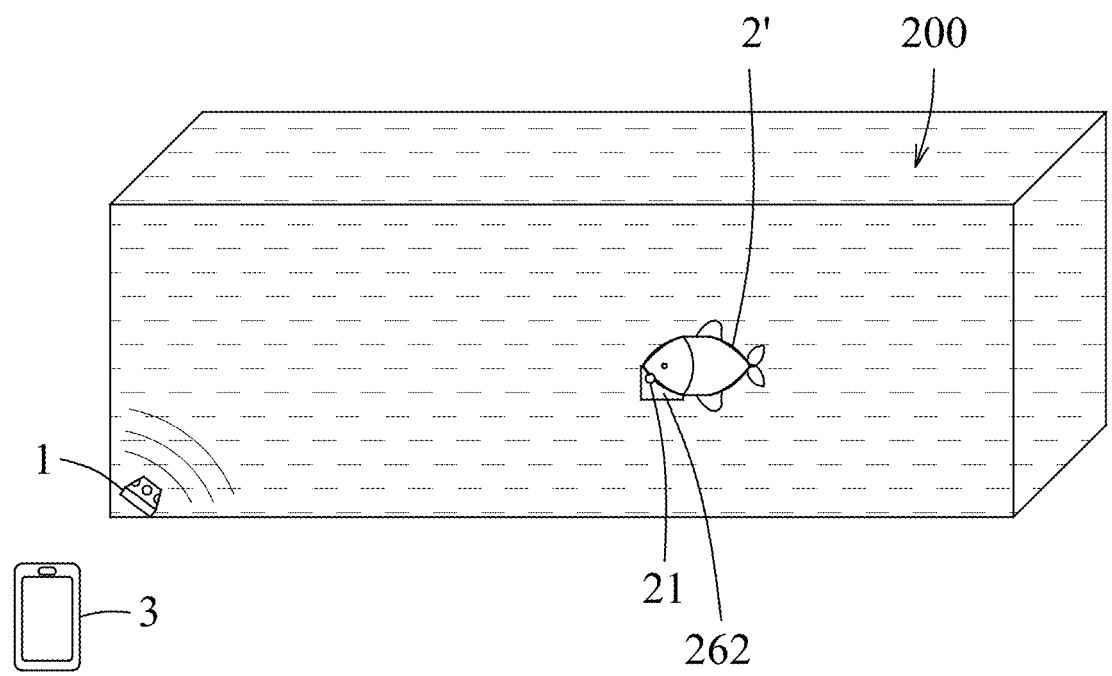
FIG. 5 is a schematic diagram illustrating a specific aquatic area where the robot fish system of the second embodiment of the disclosure is used.

Referring to FIGS. 4 and 5, a second embodiment of the robot fish system 100' according to the disclosure is illustrated. Since the second embodiment is similar to the first embodiment, descriptions regarding identical or similar parts of the first and second embodiments will not be repeated, and only differences between the first and second embodiments will be explained in the following paragraphs for the sake of brevity.

The robot fish system 100' includes the light-emitting device 1, a robot fish 2' and a trigger-signal generator 3.

The light-emitting device 1 of the second embodiment is similar to the light-emitting device 1 of the first embodiment in terms of structure and function, but is adapted to be disposed at a fixed location in the specific aquatic area 200. In particular, the fixed location is close to a periphery of the specific aquatic area 200, e.g., in a corner of a fish tank as shown in FIG. 5.

In this embodiment, the opaque plate 262 of the robot fish 2' extends outwardly and downwardly from the head portion 261, and the first light receiver 21 and the second light receiver 22 are disposed on the bottom of the head portion 261 respectively to the right and the left of the opaque plate 262 when looking in the forward direction.

The robot fish 2' is similar to the robot fish 2 of the first embodiment. The trigger-signal generator 3 is configured to generate a trigger signal and transmit the trigger signal to the processor 23, and the processor 23 of the robot fish 2' is configured to perform the operation procedure in response to receipt of the trigger signal.

Specifically, the robot fish 2' of this embodiment further includes a first communication module 25 that is electrically connected to the processor 23 and that supports a wireless communication protocol (e.g., Wi-Fi protocols, Bluetooth® protocols, protocols for radio frequency communication, or protocols for LoRa® technology). The first communication module 25 is configured to receive the trigger signal based on the wireless communication protocol and to transmit the trigger signal to the processor 23. It should be noted that the trigger-signal generator 3 is disposed within a communication range of the first communication module 25.

The trigger-signal generator 3 includes an input module 31, a second communication module 32 and a signal generating module 33. The input module 31 may include a key (not shown) or a button (not shown), and is configured to be manually operated to generate an input signal. The second communication module 32 also supports the wireless communication protocol, and is configured to communicate with the first communication module 25 of the robot fish 2' based on the wireless communication protocol. The signal generating module 33 is electrically connected to the input module 31 and the second communication module 32. The signal generating module 33 is configured to receive the input signal from the input module 31, to generate the trigger signal in response to receipt of the input signal from the input module 31, and to output the trigger signal via the second communication module 32 to the first communication module 25. Subsequently, the first communication module 25 transmits the trigger signal to the processor 23 which then performs the operation procedure in response to receipt of the trigger signal.

The trigger-signal generator 3 is implemented by a portable electronic device, such as a smartphone, a tablet computer or the like. In use, a user carrying the trigger-signal generator 3 (e.g., an owner of the smartphone) enters the communication range of the first communication module 25 of the robot fish 2', and operates the input module 31 of the trigger-signal generator 3 (e.g., presses the button of the smartphone) to generate and output the trigger signal to the robot fish 2'. In response to receipt of the trigger signal from the trigger-signal generator 3, the robot fish 2' approaches the light-emitting device 1 based on the algorithm as described in the first embodiment. In the process of interacting with the robot fish 2' using the trigger-signal generator 3 (i.e., the user makes the robot fish 2' approach the light-emitting device 1 by operating the trigger-signal generator 3), the user may be entertained.

In some embodiments, the trigger-signal generator 3 may be disposed at a fixed location within the communication range of the first communication module 25 of the robot fish 2', and includes a key or a button as the input module 31. In some embodiments, the light-emitting device 1 of the second embodiment may be movable in the specific aquatic area 200 (like with the first embodiment).

To sum up, for the robot fish system 100, 100' according to the disclosure, the robot fish 2, 2' moves according to how the light signal emitted from the light-emitting device 1 is received (or not received) by the robot fish 2, 2' (i.e., which one of the first light receiver 21 and the second light receiver 22 receives the light signal) in a manner that the robot fish 2 appears to approach the light-emitting device 1. It should be noted that the robot fish 2 is capable of approaching the light-emitting device 1 without utilizing global positioning system (GPS) signals. It is worth to note that the light-emitting device 1 may be disposed at the fixed location or disposed on the movable object 4, and the interaction between the robot fish 2, 2' and the light-emitting device 1 may be interesting to observe.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A robot fish system adapted to be used in a specific aquatic area, said robot fish system comprising:
 a light-emitting device adapted to be disposed in the specific aquatic area, and configured to emit a light signal in the specific aquatic area; and
 a robot fish configured to move in the specific aquatic area, said robot fish including
  a housing that includes a head portion, and an opaque plate extending outwardly from said head portion,
  a first light receiver that is disposed on said head portion to the left of said opaque plate when looking in a forward direction of the housing, that is exposed to an environment, and that is configured to receive the light signal emitted from said light-emitting device,
  a second light receiver that is disposed on said head portion to the right of said opaque plate when looking in the forward direction, that is exposed to the environment, and that is configured to receive the light signal emitted from said light-emitting device, a driving module that is disposed on said housing, and that is configured to operate in one of a random mode, a left-turn mode, a right-turn mode and a straight-moving mode for driving movement of said housing in the specific aquatic area, and a processor that is disposed in said housing, that is electrically connected to said first light receiver, said second light receiver and said driving module, and that is configured to perform an operation procedure including steps of:

determining whether any one of said first light receiver and said second light receiver receives the light signal emitted from said light-emitting device, controlling said driving module to operate in the left-turn mode to make said robot fish turn left in the specific aquatic area when it is determined that only said first light receiver receives the light signal emitted from said light-emitting device, controlling said driving module to operate in the right-turn mode to make said robot fish turn right in the specific aquatic area when it is determined that only said second light receiver receives the light signal emitted from said light-emitting device, controlling said driving module to operate in the straight-moving mode to make said robot fish move straight in the specific aquatic area when it is determined that both said first light receiver and said second light receiver receive the light signal emitted from said light-emitting device, and controlling said driving module to operate in the random mode to make said robot fish move randomly in the specific aquatic area when it is determined that none of said first light receiver and said second light receiver receives the light signal emitted from said light-emitting device.

2. The robot fish system as claimed in claim 1, wherein said light-emitting device is an infrared emitter that is configured to emit an infrared signal as the light signal.

3. The robot fish system as claimed in claim 1, wherein said light-emitting device is adapted to be disposed on a movable object that is capable of moving in the specific aquatic area.

4. The robot fish system as claimed in claim 1, wherein said light-emitting device is adapted to be disposed at a fixed location in the specific aquatic area.

5. The robot fish system as claimed in claim 4, wherein the fixed location is close to a periphery of the specific aquatic area.

6. The robot fish system as claimed in claim 1, wherein said processor is configured to perform the operation procedure in response to receipt of a trigger signal.

7. The robot fish system as claimed in claim 6, wherein said robot fish further includes a first communication module electrically connected to said processor, and configured to receive the trigger signal based on a wireless communication protocol and to output the trigger signal to said processor.

8. The robot fish system as claimed in claim 7, further comprising a trigger-signal generator including:

a second communication module that is configured to communicate with said first communication module based on the wireless communication protocol;

an input module that is configured to be manually operated to generate an input signal; and a signal generating module that is electrically connected to said second communication module and said input module, and that is configured to receive the input signal from said input module, to generate the trigger signal in response to receipt of the input signal received from said input module, and to output the trigger signal via said second communication module to said first communication module.

9. The robot fish system as claimed in claim 8, wherein said trigger-signal generator is disposed within a communication range of said first communication module.

10. The bionic robot fish system as claimed in claim 8, wherein said trigger-signal generator is a portable electronic device.

* * * * *